(12) United States Patent
Smith et al.

(10) Patent No.: US 12,444,264 B2
(45) Date of Patent: Oct. 14, 2025

(54) AUTOMATED STORE

(71) Applicant: Swyft, Inc., San Francisco, CA (US)

(72) Inventors: Gower Smith, San Francisco, CA (US); Lincoln Smith, San Francisco, CA (US)

(73) Assignee: Swyft Inc., San Francisco, CA (US)

( * ) Notice: Subject to any disclaimer, the term of this patent is extended or adjusted under 35 U.S.C. 154(b) by 249 days.

(21) Appl. No.: 16/756,714

(22) PCT Filed: Sep. 11, 2018

(86) PCT No.: PCT/US2018/050524
§ 371 (c)(1),
(2) Date: Apr. 16, 2020

(87) PCT Pub. No.: WO2019/051505
PCT Pub. Date: Mar. 14, 2019

(65) Prior Publication Data
US 2021/0374815 A1    Dec. 2, 2021

(30) Foreign Application Priority Data

Sep. 11, 2017 (AU) ................................ 2017903687

(51) Int. Cl.
*G07F 11/16* (2006.01)
*G05B 19/4155* (2006.01)
*G06Q 30/0601* (2023.01)
*G07F 9/00* (2006.01)

(52) U.S. Cl.
CPC ........ *G07F 11/165* (2013.01); *G05B 19/4155* (2013.01); *G06Q 30/0601* (2013.01); *G07F 9/001* (2020.05); *G07F 9/002* (2020.05); *G05B 2219/40269* (2013.01)

(58) Field of Classification Search
CPC .. G07F 11/1657; G07F 11/165; G07F 11/007; G07F 9/001; G06Q 10/087; G06Q 30/0601; G06F 9/02; G05B 19/4155; G05B 2219/40269
See application file for complete search history.

(56) References Cited

U.S. PATENT DOCUMENTS

| | | | |
|---|---|---|---|
| 6,535,790 B2 | 3/2003 | Nakano et al. | |
| 9,111,313 B2 | 8/2015 | Chirnomas | |
| 9,430,788 B2 | 8/2016 | Stiernagle | |
| 9,636,825 B2 | 5/2017 | Penn et al. | |
| 2007/0158358 A1* | 7/2007 | Mason, II | ............... G07F 11/08 221/241 |

(Continued)

FOREIGN PATENT DOCUMENTS

| | | |
|---|---|---|
| CN | 206011103 U | 3/2017 |
| WO | 01/13342 A1 | 2/2001 |

OTHER PUBLICATIONS

PCT International Preliminary Report on Patentability in International Application PCT/US2018/050524, mailed Mar. 17, 2020, 7 pages.

(Continued)

*Primary Examiner* — Charles E Anya
(74) *Attorney, Agent, or Firm* — Toering Patents PLLC

(57) ABSTRACT

An automated store includes a modular shelving structure and an autonomous robotic apparatus that operates to transfer items to and from the shelving structure.

13 Claims, 9 Drawing Sheets

(56) References Cited

U.S. PATENT DOCUMENTS

| | | | |
|---|---|---|---|
| 2011/0054673 A1* | 3/2011 | Segal | G07F 11/004 700/230 |
| 2015/0310694 A1* | 10/2015 | Will | G07F 11/44 221/13 |
| 2015/0375398 A1* | 12/2015 | Penn | B25J 5/005 700/218 |
| 2016/0304281 A1* | 10/2016 | Elazary | B65G 1/0492 |
| 2017/0098957 A1* | 4/2017 | Sankar | H02J 7/025 |
| 2017/0121113 A1 | 5/2017 | Wagner et al. | |
| 2017/0225891 A1* | 8/2017 | Elazary | B65G 1/1375 |
| 2017/0242438 A1 | 8/2017 | Chan | |
| 2017/0322561 A1* | 11/2017 | Stiernagle | B65G 1/1378 |
| 2018/0005167 A1 | 1/2018 | Smith | |

OTHER PUBLICATIONS

U.S. Appl. No. 62/713,982, filed Aug. 2, 2018, entitles "Belt Conveyor Bucket", 23 pages.

Solebox Berlin Opening with "Patric Mohr meets Reebok Classic" (solebox) [online], https://www.youtube.com/watch?v=vdiQ49qNFo8 &t=22s, entire video, especially demonstration 0:16-0:24 (Jul. 16, 2014).

International Search Report and Written Opinion for PCT/US2018/ 050524, mailed Jan. 15, 2019.

* cited by examiner

AUTOMATED STORE

This application is a National Stage Application of PCT/US2018/050524, filed Sep. 11, 2018, which claims benefit of Australian Patent Application No. 2017903687, filed Sep. 11, 2017, and which applications are incorporated herein by reference. To the extent appropriate, a claim of priority is made to each of the above-disclosed applications.

TECHNICAL FIELD

The present invention relates to an automated store that comprises a robotic apparatus system for facilitating the provision of goods stored in an automated store to consumers.

BACKGROUND

Automated vending has become more popular over the last decade thanks to technologies such as the internet and improved automated stores. For example, U.S. Publication No. 2018/0005167 entitled System and Method for Facilitating the Provision of Goods, the disclosure of which is incorporated herein by reference, discloses a system and a method for facilitating the provision of goods using automated stores through an on-line marketplace.

Traditional retail shelving systems are organized in accordance with merchant needs to form shelving configurations that allow consumers to browse products by walking down an aisle with one or more product displays either standing against a wall or freestanding with products on one side or on both sides. Traditional retail stores, however, can be expensive as they require many employees. Other issues of traditional stores include product theft and management of inventory. Automated kiosks and vending machines alleviate these problems but lack the ability to present a brand the way brand executives and merchants of popular brands require.

Traditional automated stores or vending machines are hosted in large metal cabinets and have several restrictions preventing the product from being displayed in its entirety. These systems, however, lack the physical presence of high-end retail stores where client can fully experience the product in its entirety.

Virtual reality displays have also been used in automated retailing. However, these systems do not have the same impact as physical retail stores. Further, virtual reality does not offer the same consumer experience as walking into physical premises, for example, at a mall or airport.

Thus, there is a need for a system which provides buyers with more immediate fulfilment following the purchase of items as well as improving delivery time and efficiency.

DETAILED DESCRIPTION

Figure 1:
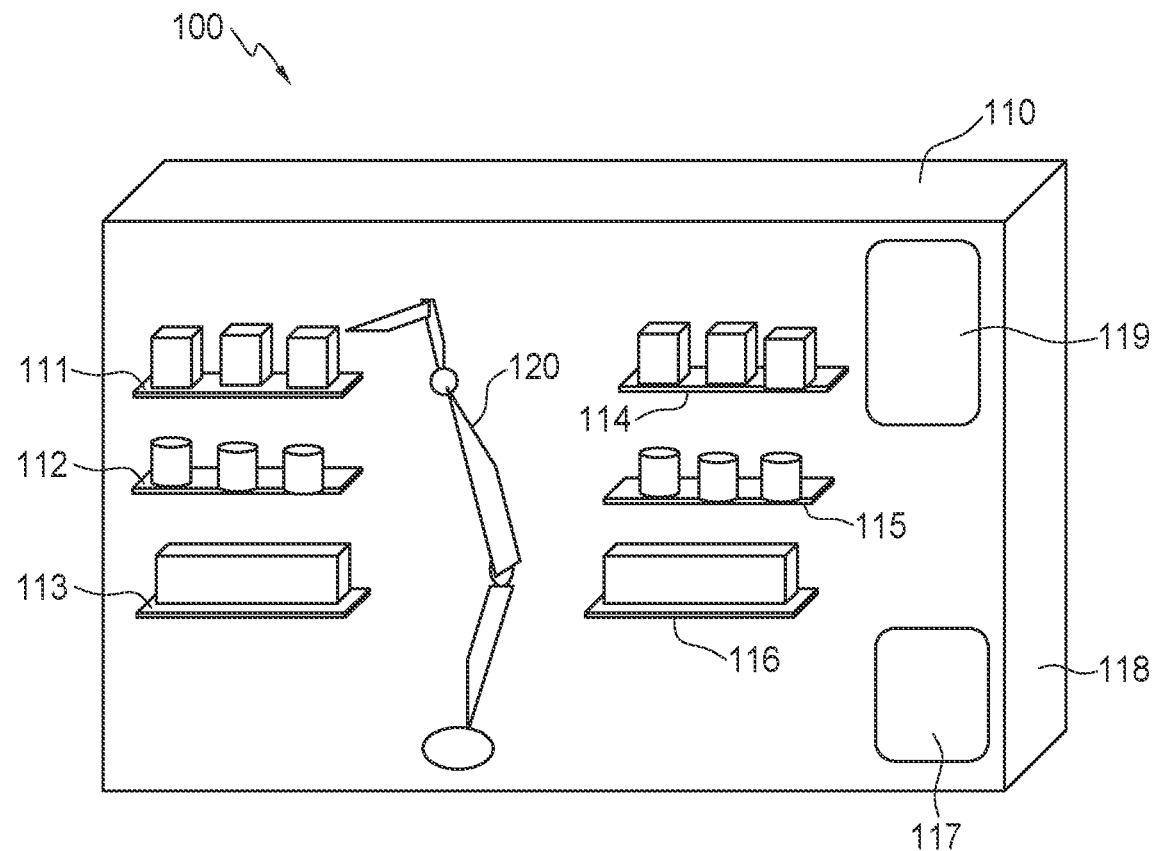
FIG. 1 is a schematic representation of an automated store enclosure having a robotic apparatus for retrieving items from the enclosure.

In accordance with a first aspect, the present invention provides an automated store having an enclosure that limits access for consumers to the items contained inside; a shelving structure having a plurality of shelves arranged to store items and display items inside the enclosure; and a robotic apparatus arranged to retrieve selected items from one or more shelves and consign the retrieved items to a consumer; wherein the robotic apparatus is free to move in relation to the shelving structure without a permanent physical connection to shelving structure or enclosure.

In embodiments, the robotic apparatus is also arranged to move outside of the enclosure to deliver items to consumers in far proximity of the automated store. In embodiments, items are consigned to consumers in close proximity of the automated store thorough a consignment door in the enclosure. In embodiments, the automated store comprises at least one or more robotic apparatus for faster/more efficient delivery to consumers and/or couriers.

In accordance with a second aspect, the present invention provides a system for variable control dispensing on the basis of stock keeping units ("SKUs"), not machine basis, through software control of motors and other mechanical elements of the machine and/or the robotic apparatus.

In accordance with a third aspect, the present invention provides a modular retail shelving structure for display of items to consumers. The shelving structure includes a plurality of shelves arranged to form a stacked structure and engage with a robotic apparatus that is free to move in relation to the shelving structure without a permanent physical connection to shelving structure, wherein engagement with the robotic apparatus is performed to transfer one or more items hosted on one or more shelves to the robotic apparatus.

In some embodiments, the modular retail shelving structure includes a mechanism for shifting items across shelves to the robotic apparatus. In embodiments, the structure is configured so that the robotic apparatus can load items on one or more shelves.

In accordance with a fourth aspect, the present invention provides a robotic apparatus for retrieving items from a shelving structure in an automated store. The robotic apparatus includes a motorised platform arranged to move in the X and Y directions in the proximity of the shelving structure; an articulated arm with a first end mounted onto the motorised platform; an item bin mounted at a second end of the articulated arm; and a gear mechanism arranged to engage with a delivery mechanism of the shelving structure to transfer items from the shelving structure to the item bin.

In embodiments, the software that controls the XY robotic mechanism allows users of the system to program variable dispensing methods from the shelf to ensure accuracy of collection from the shelf, such as programming the height that the robotic apparatus engages with the shelf (e.g., high, medium, low) to control how items are moved off the shelf to the bin, such as toppling off the shelf feet forward or head forward. In some embodiments, the software that controls the XY robotic mechanism allows users of the system to program the speed that the motor turns to move the product off shelf. In some embodiments, the robotic apparatus comprises a flap, door or other mechanism to secure the product in the delivery bucket before bringing it to the consumer output area. The software that controls the robotic apparatus may allow users of the system to program the timing of when flap, door or other mechanism is activated.

Embodiments of the present invention also include a robotic visioning system whereby a shelving arrangement can be configured manually and a robotic retrieval system can read the shelving arrangement and communicate such arrangement to a control system such that the system is automatically configured after physical setup.

Embodiments of the present invention also include a system as described whereby the shelving system incorporates a passive mechanism that can be operated by the robotic retrieval system to move an item from the shelf into the robotic retrieval system. In embodiments, the mechanism is a divider with gear and belt that moves a pusher from the rear of the shelf to towards the front of the shelf to move items into the robotic retrieval system. In embodiments, the system uses conveyer belt under the product to move products from shelf to robotic retrieval system.

Embodiments of the present invention also include a robotic retrieval system that is freestanding that incorporates a conveyer belt system at its base such that items moved onto it from shelves can be moved to a front position for final delivery to consumers or courier drivers. In some embodiments, the robotic retrieval system is battery operated and charged when docking to shelves, recharge locations or delivery positions. In some embodiments, the robotic retrieval system is an XYZ robotic system such that the robotic mechanism can load products on to the shelves as well as retrieve them. Also, such a system may be configured with a grabber or suction mechanism that assists the robot to pick up or release an item.

Embodiments of the present invention also include a system for automated retail delivery of products where the components of the secure retail shelving system (shelves and dividers) are common and can be used in either a secure robotic retail store display or in a vending machine.

Embodiments of the present invention also include a robotic retail delivery system designed such that a robot can fetch a product from a shelf and turn 90 degrees or 180 degrees to an output location through which the product fetched can be delivered to a consumer.

In some embodiments, the robotic apparatus incorporates a camera that faces into the shelf system. The image taken by the camera may be shown to a consumer via a consumer software system to verify existence of the product.

In embodiments, the system allows consumers to remotely order and reserve items stored in the system and with a communications system to a courier infrastructure (e.g., Uber or robot) that can collect items and deliver them to consumers.

In accordance with a sixth aspect, the present invention also includes a system for receiving orders, and determining the nearest micro-warehouse, then splitting orders to allow some items to be delivered instantly within an hour from automated micro-warehouses.

Advantages of the present invention include the capability of providing a fulfilling purchasing experience of high end products to consumers using a full automated store serviced by a robotic system. Further advantages include the automated management of inventory that can be remotely monitored without risk that a consumer has been able to access it or an item misplaced. The secure and high integrity recording of all inventory movements and securing of the inventory area is important for on-line commerce transactions where consumers want to know the current status of inventory.

Embodiments are directed to a robotic system for facilitating the provision of goods stored in an automated store to consumers. Further, embodiments relate to automated stores where high end products can be merchandised on shelves and displayed in secure glass display cases with minimal structure fixtures. The products can be accessed via the robotic system.

Referring now to FIG. 1, there is shown a schematic representation of an automated store 100 with a robotic apparatus 120 in accordance with embodiments. The shelving systems 111-116 can be encased in glass to create a 360-degree showcase 110 allowing consumers to walk around the product display. This is in contrast with current vending machines that are housed in metal cabinets preventing such an experience. In current vending machines, the delivery mechanisms need to be prefixed such that the motors can push items into a delivery output area, which is typically a delivery door/compartment that is directly below shelves. Even in vending machines equipped with XY robotic fetch systems or conveyor mechanisms, products delivered into the XY delivery bin or onto the conveyor can be brought to a home position in the machine, typically at the lower left or right of the shelves. All such systems are preconfigured and housed in a system where the delivery mechanism (conveyor or robotic arm) is physically connected to the delivery output area.

A delivery door 117 in the front of the enclosure opens to allow the robotic apparatus to deliver products out of the enclosure. A side door 118 is provided on the side of the enclosure to allow the robotic apparatus to move in and out of the enclosure. This enables the robotic apparatus to deliver items to consumers in other locations, e.g., an airport lounge, an Uber driver, a drone or other robotic device. Optionally, a touch screen 119 can be mounted on the front of the enclosure to control the various operations possible with the automated store.

Embodiments of the invention described herein allow brands and their merchants to assemble flexible retail shelving systems and optionally add transparent panels to create a more secure merchandising display where required. For example, a secure display can be assembled as a single aisle of products or back to back aisles of products secured within glass or acrylic glass panels (such as Plexiglass or Perspex). The panels provide a small space (about 18 inches) between the shelves and the panels allowing consumers to walk along the display or around the display.

Figure 2:
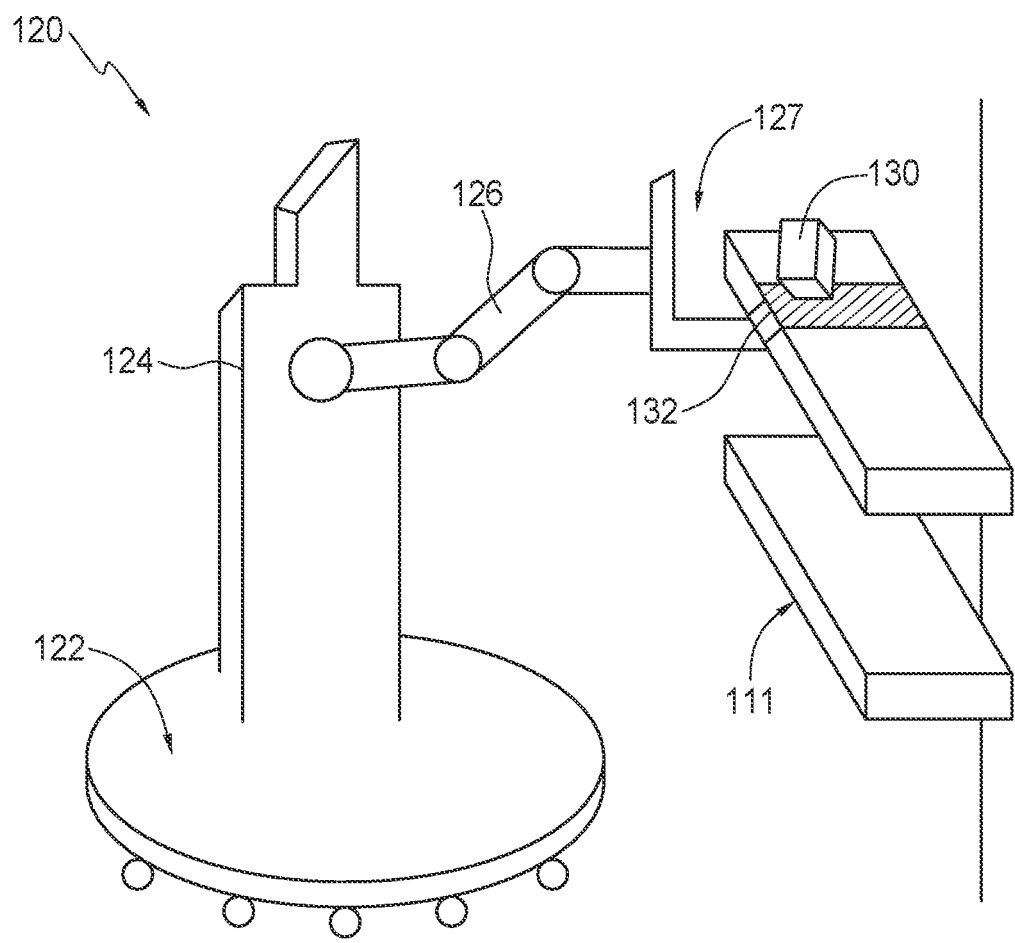
FIG. 2 is a front perspective view of the robotic apparatus of FIG. 1.

FIG. 2 is a schematic illustration of a robotic apparatus in accordance with one embodiment. The robotic apparatus 120 includes a stage or platform 122 that is operable to be movable in the X and Y directions within the automated store under programmed control and an extendable body 124 that is operable to be movable in the Z direction under programmed control. The robotic mechanism also includes an articulating arm 126 that can extend from the body to engage with the shelving structure 111 in order to transfer items to or from one or more shelves. The robotic arm 126 and item bin 127 can also be used to deliver items to consumers.

The stage or platform 122 is a base unit which uses 360° rotatable wheels to move around the floor, similar to a Roomba vacuum cleaner. The base unit is powered by lithium ion batteries, and includes low voltage motors that turn the wheels, and accelerator controls.

The base unit has a vertical track affixed on top of it. The track allows the dispense mechanism to travel up and down on it. The dispense mechanism is one of three types: a basic bucket, with no conveyor; a conveyor bucket; and an articulated arm.

The base unit includes optical sensors to detect location and to navigate. All three dispense mechanisms also include optical sensors and additional sensors, for example, to detect acceleration, pressure, and weight, all of which helps to navigate or dispense a product.

The basic bucket navigates to the shelf by using both the bucket and the base stand to navigate, engage the divider on the shelf and dispense (detect) a product into the bucket. The conveyor bucket does the same, but this with a conveyor belt and extra sensors as well to improve dispense integrity. The articulated arm does the same as above, but it engages directly with the product and pulls the product off the shelf.

The item bin may actually be located at the item delivery door of the enclosure rather than being part of the robotic apparatus. The articulating arm can collect items from the shelf, and then move the items to the collection basket or locker, where consumers grab it. In this embodiment, the articulating arm does not include an item bin/basket.

The visioning system used by the various hardware components rely on the physical construct created using shelves within an enclosure. The base unit of the robotic apparatus is affixed with a very high frame rate greyscale camera that takes images at 200 Hz. The camera also uses light pulses to transmit light toward a shelf and to receive the reflected light back, which creates a 3D map of the area. The robot is then able to use this map to navigate to physical markers that are pre-defined in the item database.

The shelving system may also include physical markings on the shelves or dividers that create an array of slots for engagement with the robotic apparatus. These slots are pre-set in a database to contain certain products in certain slots. An infrared reader reads along the bottom of each shelf to identify these dispense points. The robot then identifies the appropriate slot to vend from based on the stored database location and the location that it sees through the vision system. The robot then dispenses from that slot, and when it verifies that "an item" has been vended into it, without necessarily knowing what item has been vended, it may proceed.

A conveyor belt mechanism may be incorporated with the basket to transition products from the shelf cleanly such that the products do not topple over due to the change of inertia.

In an embodiment, a bucket may be associated with the shelving unit to retrieve items from the shelves. A bucket system in accordance with this embodiment is shown in U.S. Provisional Patent Application No. 62/713,982 (Now application Ser. No. 16/530,924 (Abandoned)) entitled Belt Conveyor Bucket, the entirety of which is incorporated herein by reference. In this embodiment, once the items are retrieved from the shelf and contained within the bucket, the robotic assembly can remove the items from the bucket for delivery to the customer.

The system further allows for a store of any dimension from the size of a large vending machine to the size of an existing traditional retail store to be laid up with merchants deciding the shelf heights and the aisle configurations, lengths of aisles, etc. For example, a 5,000 square foot retail store could be equipped with the retail merchandising system described herein and the store could operate without any employees because of the advances described in the system. In one embodiment, a store can be configured with back-to-back aisles having 6 foot shelf sections with each section being 2 feet deep meaning, that the ends of the aisles are 4 feet deep, as is typical in U.S. retail store shelving systems. If two sections are used back to back and shelves added to the ends, the shelving array would be 16 feet in length (plus the small added space for the shelf joiners) and 4 feet in width.

Figure 3:
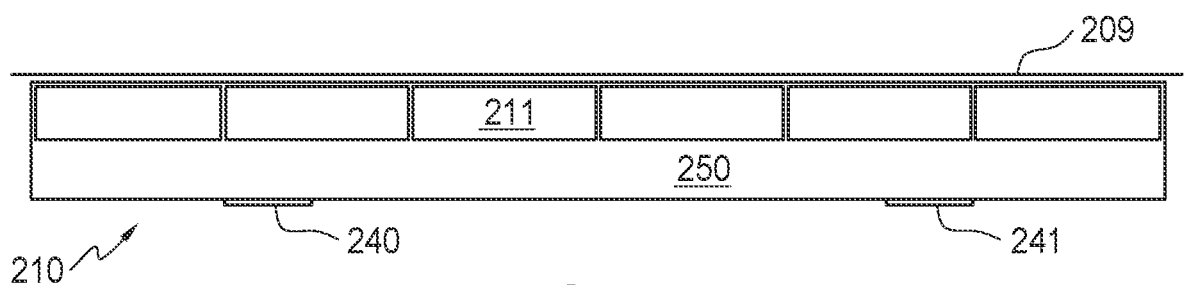
FIGS. 3-5 are block diagrams of different example configurations of automated store enclosures and corresponding shelving structures.
Figure 4:
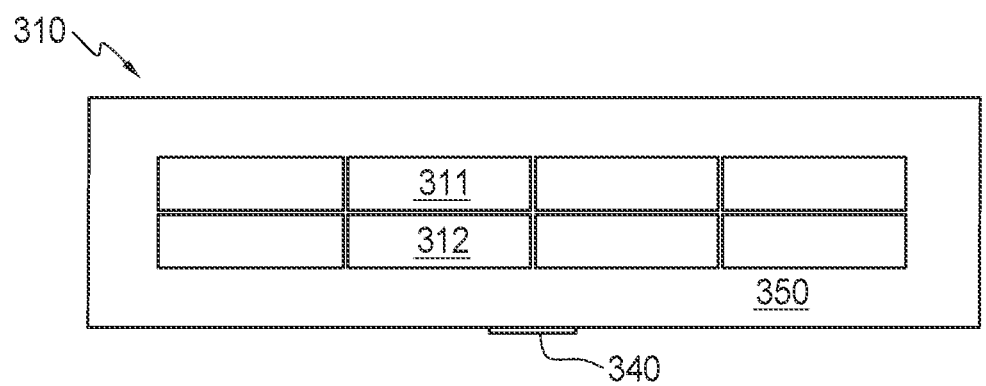
Figure 5:
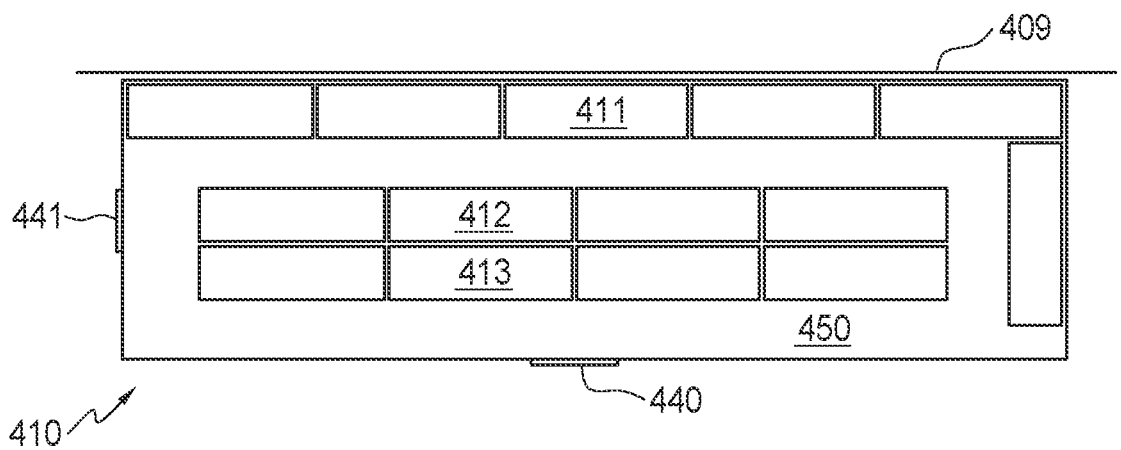

For example, FIGS. 3-5 illustrate different possible configurations of a robotic store and shelving enclosure. In FIG. 3, the enclosure 210 is positioned up against wall 209 and includes six shelf sections like section 211. Each shelf section is 2 feet deep and 6 feet wide. In between the front of the shelves and the front enclosure panel is fetch and delivery area 250, a space measuring 18 inches deep in which the robotic assembly roams to pick and place items from the shelf sections. At least the front panel, and possibly the side panels, are glass panels to permit easy viewing by users and customers. Two user stations 240, 241 are configured at or near the front of the enclosure.

FIG. 4 illustrates a freestanding enclosure 310 having four glass panels, one in front, one in rear, and on both sides. Shelf sections including shelves 311, 312 are configured in a back-to-back orientation so that users can view shelves from either side of the enclosure. The fetch and delivery area 350 wraps around the two rows of shelves so that the robotic tool can service shelves on both sides of the enclosure. At least one user station 340 is located near the front of the enclosure.

FIG. 5 illustrates enclosure 410, which is positioned against wall 409. In this embodiment, shelves including section 411 are organized into a back row that sits against the wall 409. A pair of rows is arranged in the middle of enclosure 410, with the fetch and delivery area 450 wrapping around the paired rows, including an inside row having section 412 and an outside row having section 413. One user station 440 is located on the front of the enclosure and another user station is located on the side of the enclosure.

Figure 6:
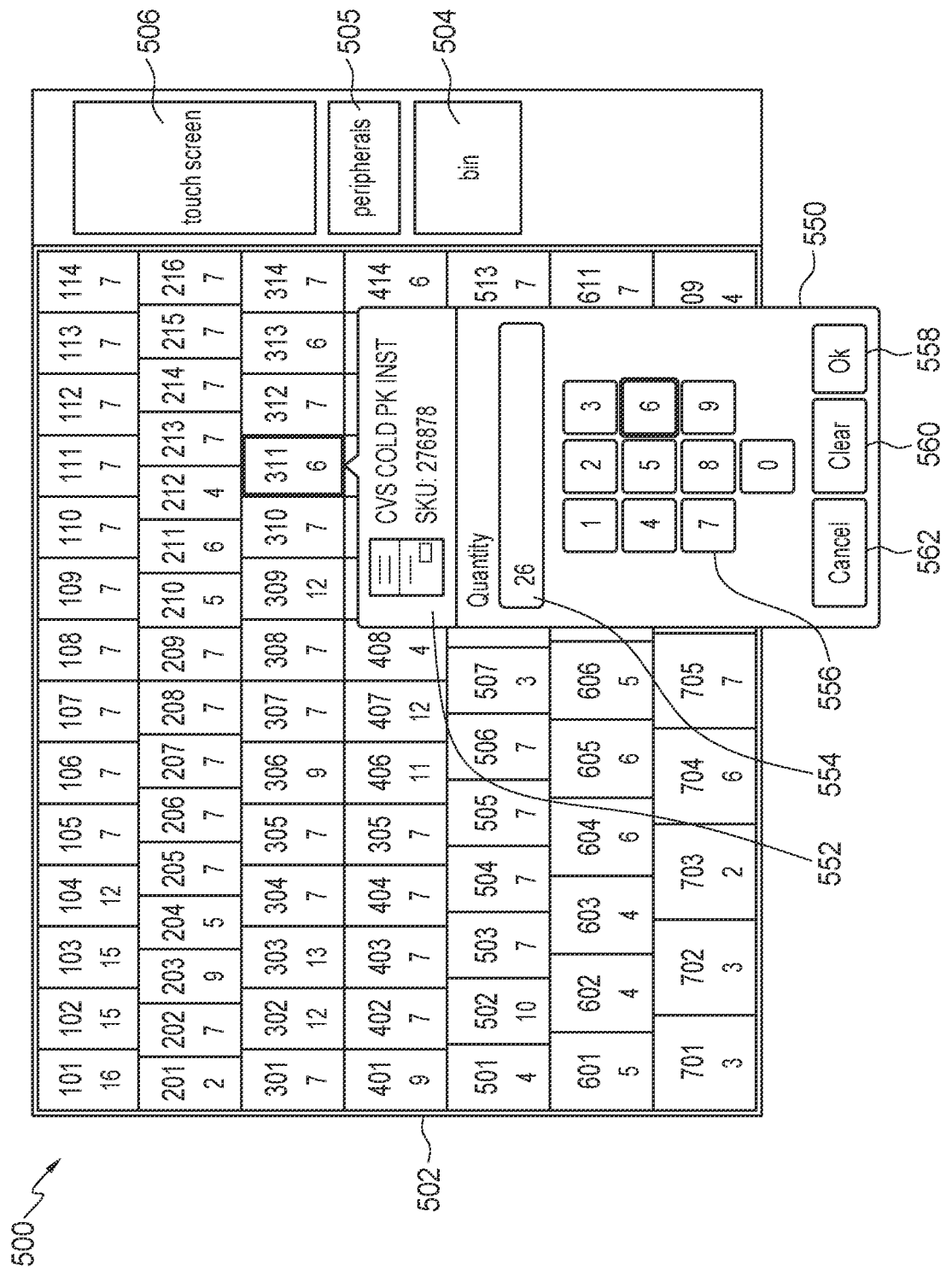
FIG. 6 is a screen display having a pop-up window for updating inventory status for item storage bins.

Referring now to FIG. 6, a controller 500 includes a display screen 502 that shows all the slot or bin locations in a shelving structure, and user controls 504, 505, 506. Selection of user control 504 labeled "bin" allows the user to identify one of the bins for configuration or updating by the user. Selection of user control 505 labeled "peripheral" allows the user to identify one or more peripheral devices for configuration or updating by the user. Selection of user control 506 labeled "touch screen" causes pop-up window 550 to appear and display an inventory control touch screen.

In this example, the user has identified bin 311 and selected the inventory touch screen. A header area 552 indicates the product name and the SKU associated with that product. A data entry field 554 labeled "Quantity" receives input from the user via keypad 556, in this case the user has typed "26" into the data field. The user may accept the input by pressing button 558 labeled "OK;" reject the input and start over by pressing button 560 labeled "Clear;" or exit the routine by pressing button 562 labeled "Cancel."

Figure 7:
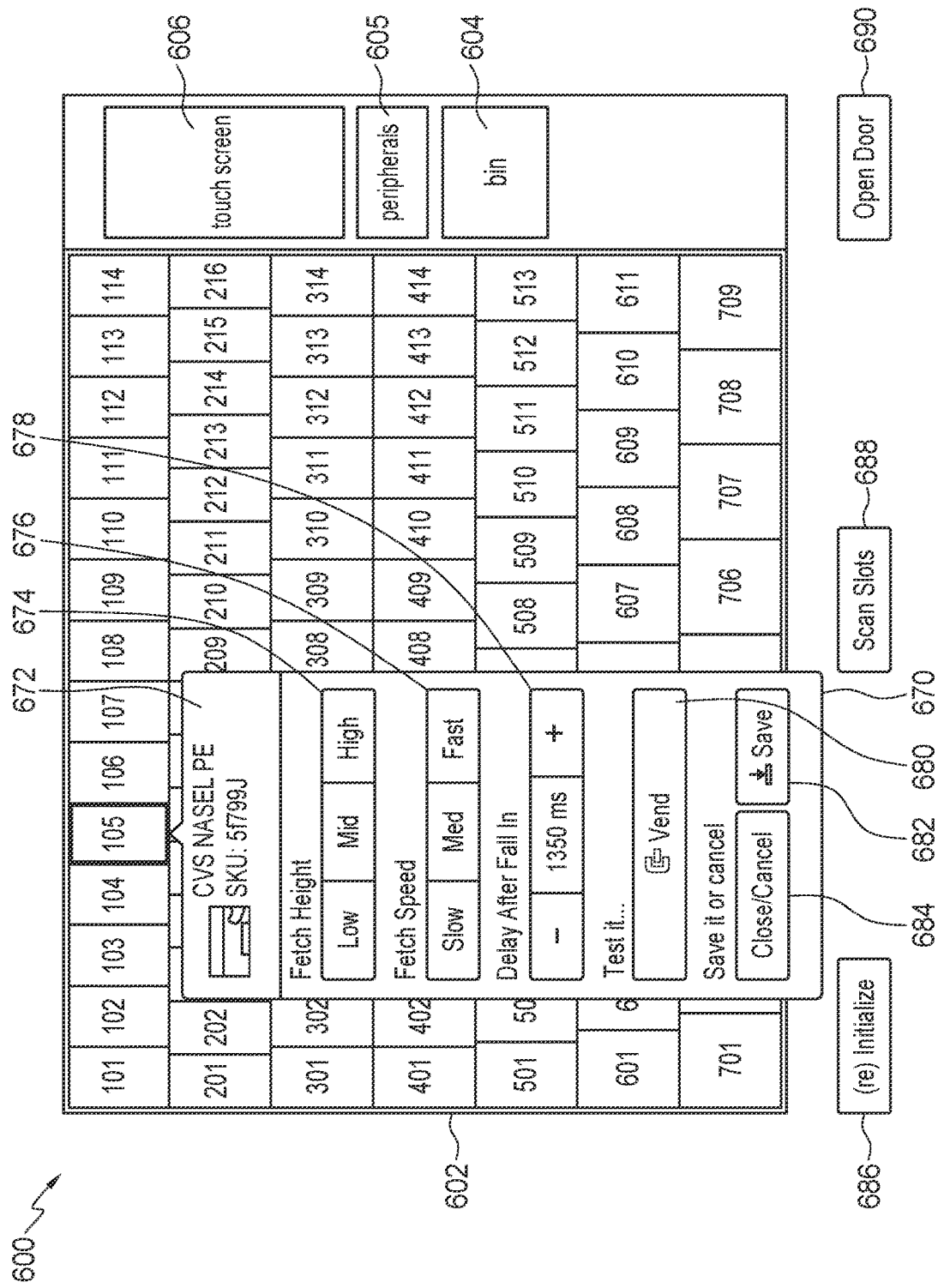
FIG. 7 is a screen display having a pop-up window for configuring item storage bins.

Referring now to FIG. 7, a controller 600 has a display screen 602 and user controls 604, 605, 606, just as in FIG. 6. In addition, there are three buttons located below display screen 602. Selection of button 686 labeled "(re)initialize" after selecting a bin allows the user the configure or to reconfigure the selected bin, as will be described. Selection of button 688 labeled "Scan slots" causes the controller to scan all bins and provide an inventory report. Selection of button 690 labeled "Open door" after selecting a bin causes the controller to open the selected bin.

In this example, the user has selected bin 105 and also selected button 686 in order to configure (or reconfigure) bin 105. This causes pop-up window 670 to be displayed. A header area 672 indicates the product name and the SKU associated with that product. A first set of widgets 674 allows the user to set or change fetch height, that is, the height at which the robotic apparatus will engage with the product stored in bin 105. In this case, the height choices are limited to low, mid or high, although other choices or data fields could be presented. A second set of widgets 676 allows the user to set or change the fetch speed, that is, the speed at which the robotic apparatus engages with the stored product. A third set of widgets 678 allows the user to set or change the time delay before the robotic apparatus disengages with the shelving structure, i.e., the delay after the item has fallen into the delivery bin. In this example, a default time of 1350 ms is provided, with plus and minus keys to raise or lower that time accordingly. This prevents closing the basket too early in order to avoid having the product get jammed during the dispense process.

Once the bin is configured, the user may test operation by selecting button 680 to test the operation for vending the item. If the configuration is acceptable, the user can save the configuration by selecting the "save" button 682. Otherwise, the use may cancel or leave the configuration routine by selecting button 684 labeled "Close/Cancel."

Figure 8:
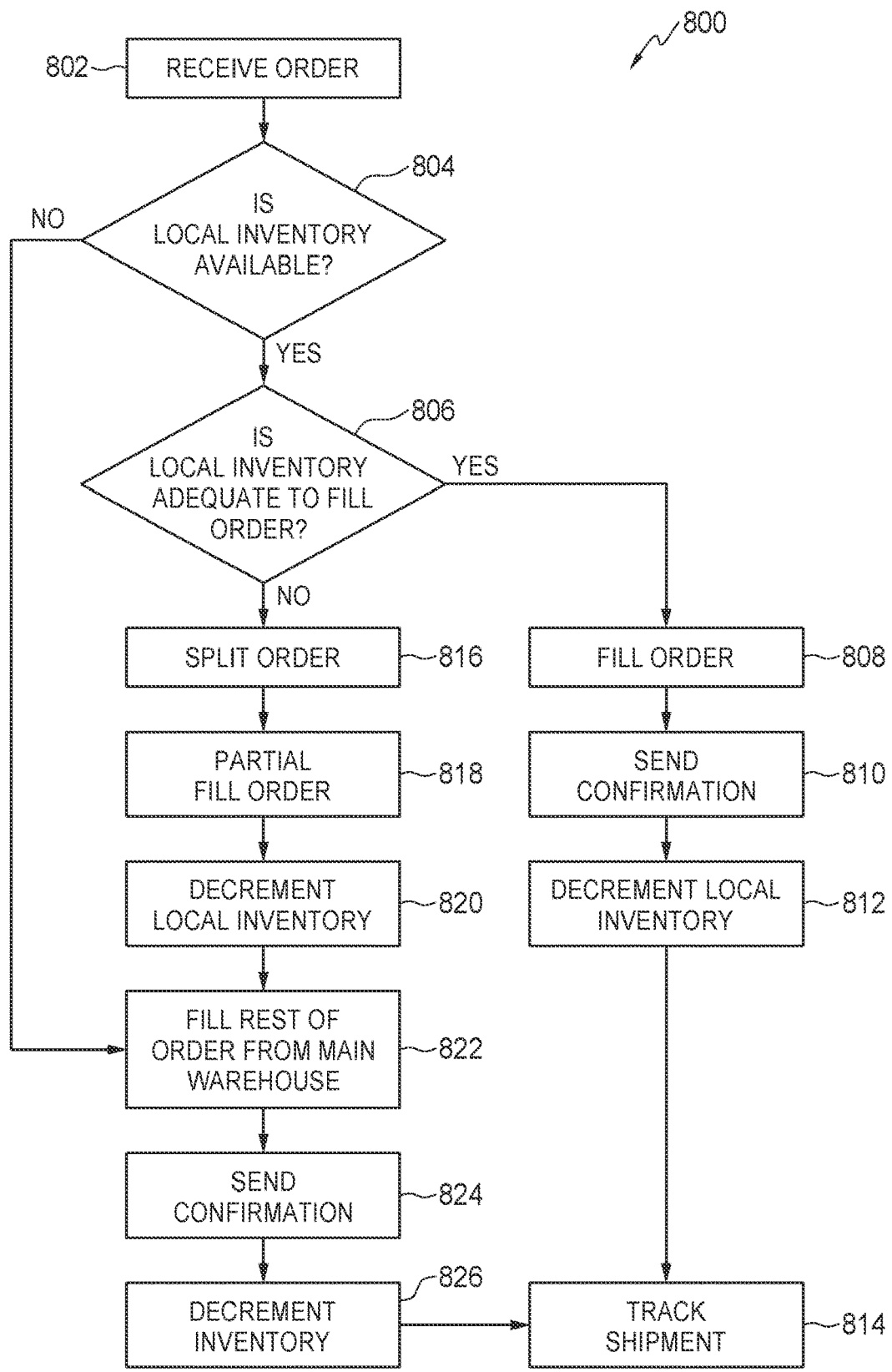
FIG. 8 is a flow chart illustrating a process for filling orders using an automated store.

Turning now to FIG. 8, a process 800 for filling orders in an automated store environment is illustrated. In step 802, an order is received. In step 804, local inventory is searched to determine if the item requested is available in the local inventory. If so, then in step 806, it is determined whether the local inventory is adequate to fill the order. If so, then the order is filled in step 808 from local inventory, and a confirmation that the order has been filled is sent to the customer in step 810. Local inventory for that item is decremented in step 812. Order tracking is implemented in step 814.

If local inventory is not adequate to completely fill the order in step 806, then the order is split in step 816 into two parts, one for the local warehouse to fill, and one for the main warehouse to fill. In step 818, the order is partially filled from inventory at the local warehouse, and in step 820 the local inventory for that item is decremented. The rest of the order is then filled from the main warehouse in step 822, a confirmation is sent to the customer in step 824, and the inventory of that item at the main warehouse is decremented at step 826. If local inventory is simply not available to fill any part of the order in step 804, then the order is filled from the main warehouse in step 822.

Micromarkets allow consumers in hotels and corporate campus environments to automatically select and check out products. Further, automated retail stores such as Amazon Go allow users to pick products off retail shelves and be automatically checked out. The system uses optics and/or other methods to sense removal of products from shelves. However, neither of these systems has proven secure enough to protect higher value items, such as jewelry. Such items are ordinarily locked up in a glass cabinet and managed by a staffed consumer service person who can retrieve the items from areas that are not accessible to consumers. Some items, such as cigarettes, alcohol and pharmaceuticals, by law, need to be secured and only released to consumers after an authenticated transaction. Automated retail stores that are akin to high-end vending machines have the ability to adequately secure products and to release them to consumers.

In other embodiments, once items are taken out of the automated store using the robotic apparatus, items can be transferred to drones, robots and/or autonomous ground vehicles for delivery to consumers.

Figure 9:
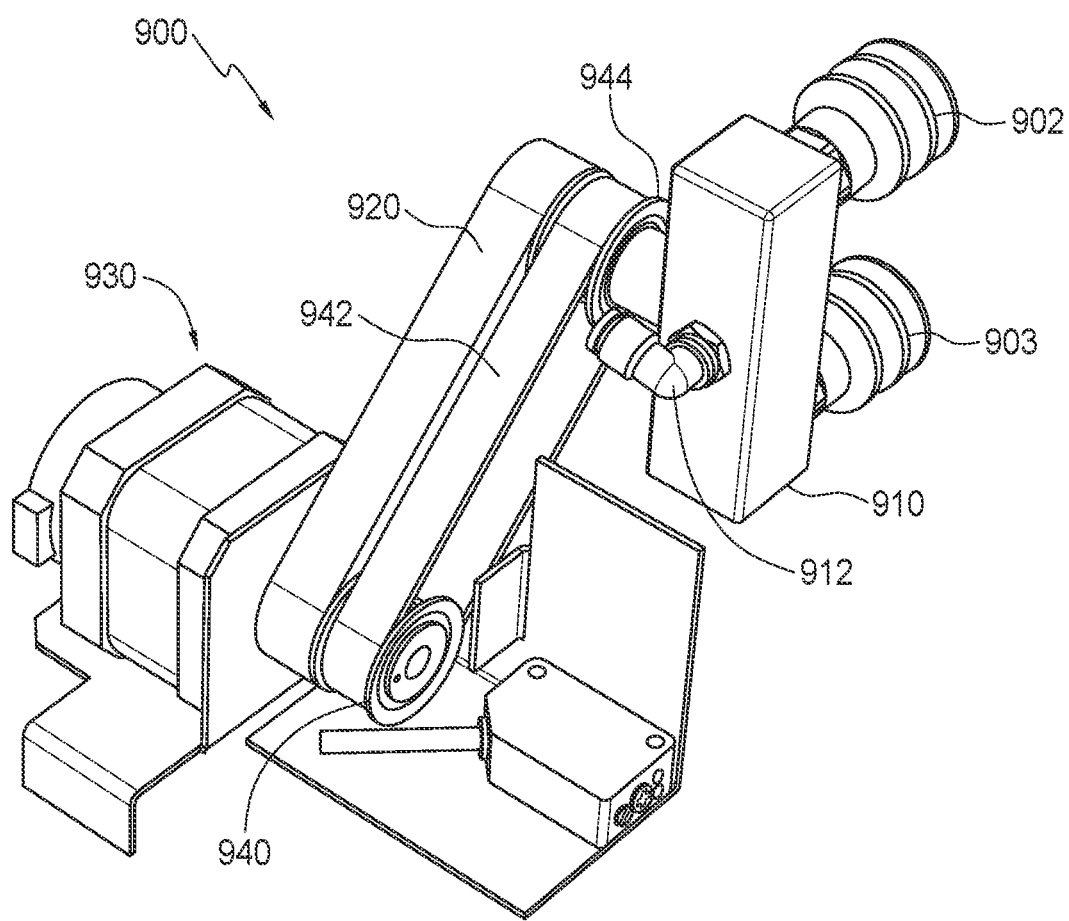
FIG. 9 is a perspective view of a robotic apparatus having suction cups.
Figure 10:
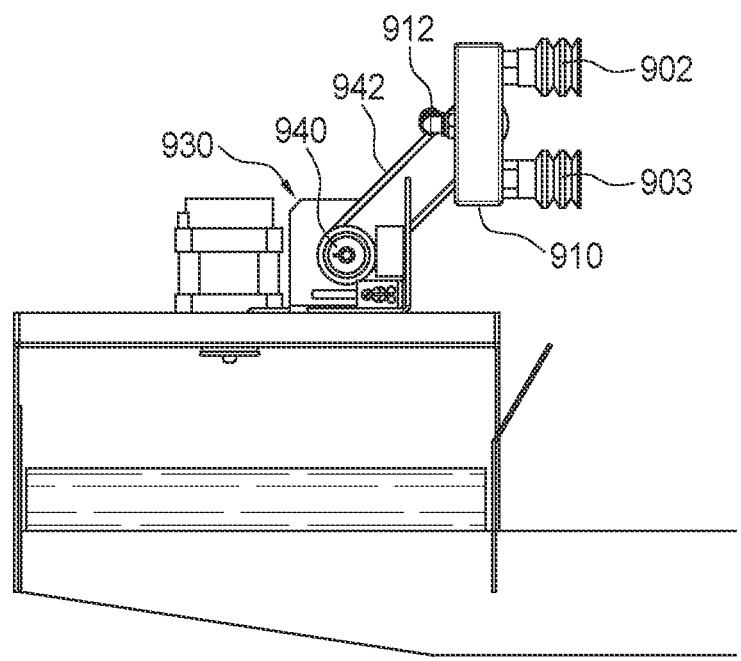
FIG. 10 is a side plan view of the robotic apparatus of FIG. 9 in an extended position.
Figure 11:
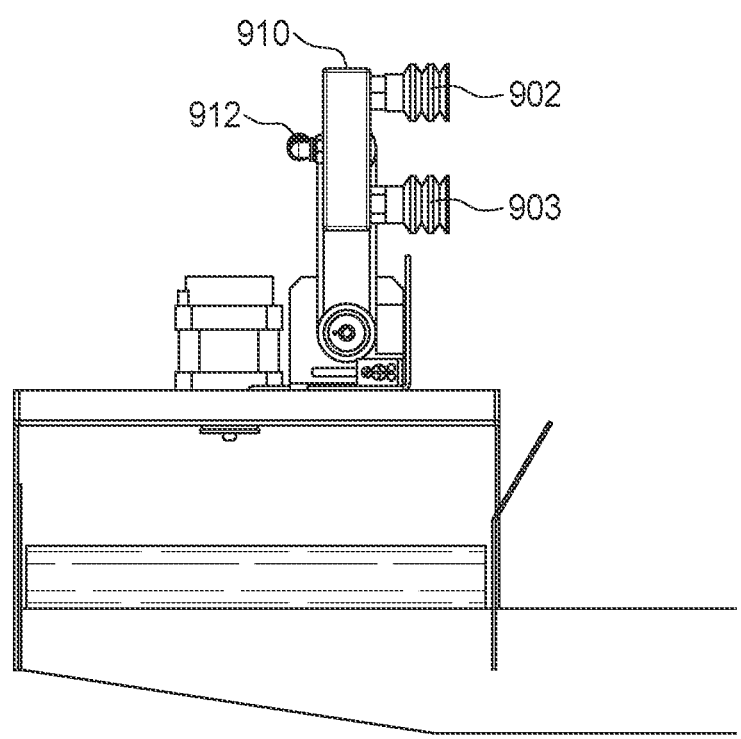
FIG. 11 is a side plan view of the robotic apparatus of FIG. 9 in a retracted position.

Referring now to FIGS. 9-11, in an alternative configuration, a suction-cup apparatus 900 includes suction-cups 902, 903 that are configured to grab an item from the shelving structure. The suction cups 902, 903 are affixed to a manifold or vacuum chamber 910 which in turn is connected to an air line 912 drawing positive pressure developed by a vacuum pump (not shown). An arm 920 couples the manifold 910 to the motor assembly 930. The motor assembly 930 drives a timing pulley 940, which in turn drives a timing belt 942 around an idler puller 944. For example, the suction cups will be advanced as shown in FIG. 10 to grab an item and retracted as shown in FIG. 11.

Figure 12:
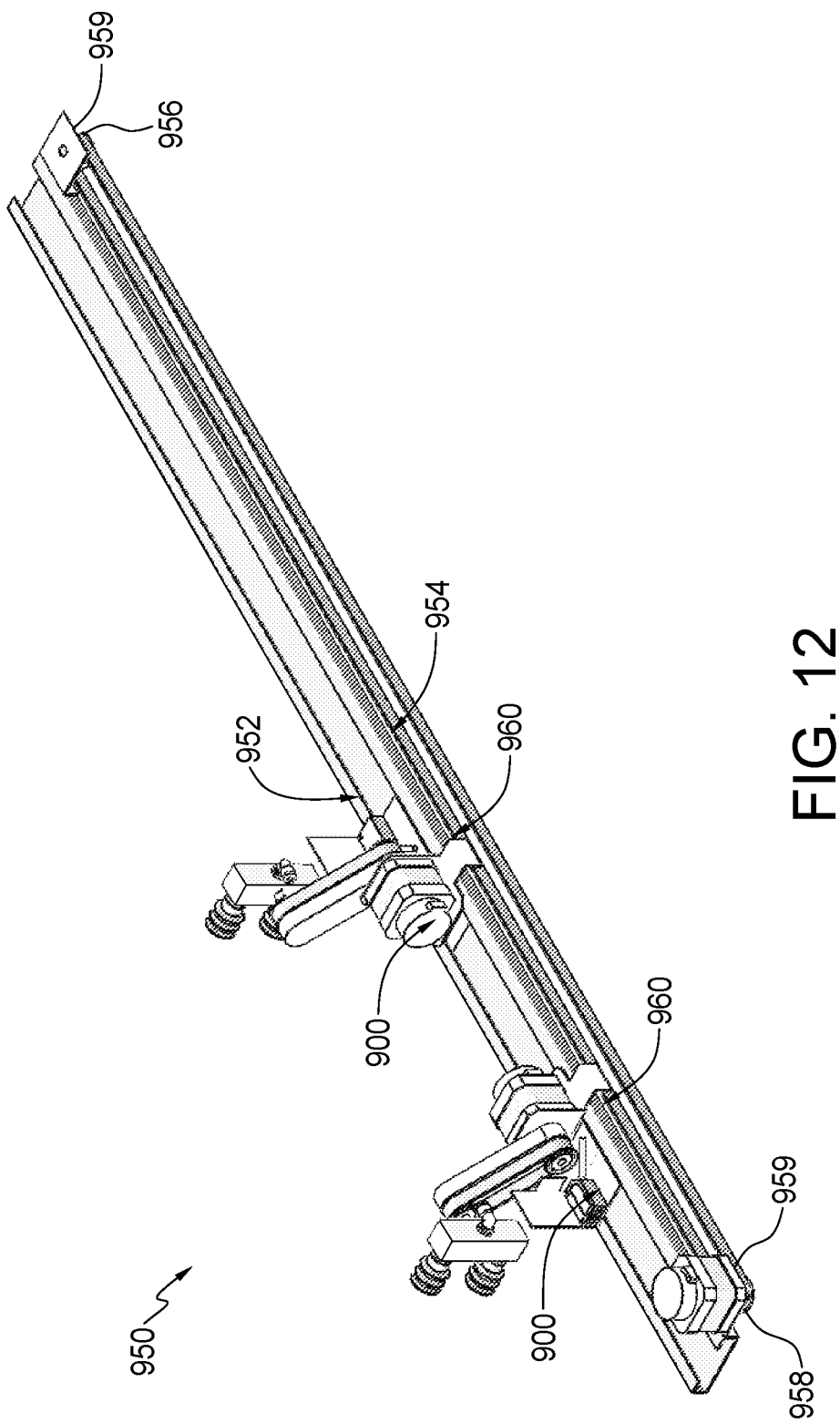
FIG. 12 is a perspective view of a linear track for the robotic apparatus of FIG. 9.

The suction cup robotic apparatus can be used on a linear track assembly 1000 incorporated with the shelving structure as depicted in FIG. 12. A length of rail 952 has a timing belt 954 affixed around a pulley 956 at one end and a stepper motor 958 at the other end. The stepper motor 958 and the pulley are mounted on brackets 959. Two different suction cup robotic apparatus are mounted on the rail and are fitted with a carriage 960 that is configured to allow the apparatus to move smoothly over the rail within the enclosure to retrieve items, under programmed control. The retrieved items are collected into a container or bin by the suction cup apparatus. In this embodiment, the robotic arm then has access to the items retrieved by the suction cup apparatus. In another embodiment, the suction cup apparatus can deliver the items to a bucket or container to which the customer has access.

In another embodiment, the suction cup assembly can be made part of the robotic arm The automated store can benefit from an ordering system implemented as a software database that allows customers to order from a product catalog. An order is received by the store/robot that the customer is addressing. The items requested in the order are then retrieved by the store/robot, either in advance, or when the customer comes to collect the items. Customers can order online, via mobile apps, or similar. The automated store is a closed-system, and therefore misplacement of product, or product shrink is not possible.

The pickup location of the products once someone orders the products. As discussed, products can be ordered in advance online or via a mobile app, but they can also be ordered at the store via a user interface. Once a customer orders the product, the robot will fetch the products. The robot then places the products into a delivery area, such as a locker, a basket, or a location behind a small closed door. In that storage location, cameras and various sensors (weight, infrared, etc.) are used to recognize that the correct product is in the delivery location. When the customer or courier comes to the store to collect the items, their identity can be verified, for example, via 2-factor authentication, logging in, geolocation services on their phone, Bluetooth beacons, etc. Once the customer is authenticated, they can take the items out of the delivery location and the system can verify that the items are gone.

While specific embodiments have been described by way of example, it should be understood that the invention is not limited to the disclosed embodiments. To the contrary, this disclosure is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An automated retail vending store for serving customers, the automated retail vending store comprising:
    an enclosure having at least one transparent panel and a receptacle, wherein the enclosure configured to restrict access to an interior of the enclosure by the customers, wherein the receptacle configured to permit removal of items by the customers from the interior of the enclosure, and wherein each different type of item within the interior of the enclosure is visible to the customers from the exterior of the enclosure through the at least one transparent panel;
    a shelving structure within the enclosure, wherein the shelving structure having a shelf configured to store and display, through the at least one transparent panel, items available for sale to the customers;
    a robotic apparatus moveable within the enclosure and free to move in relation to the shelving structure, wherein the robotic apparatus configured to:
        retrieve an item from the shelf, the item being retrieved in response to a received input from a customer that specifies a selected item,
        verify the retrieved item corresponds to the selected item, and
        deliver the selected item to the receptacle for subsequent removal by the customer; and
    an inventory management system configured to:
        monitor a current inventory of the items,
        update a current inventory of the selected item in response to the robotic apparatus delivering the selected item to the receptacle, and
        query a remote inventory management system to determine an amount of the selected item located at a remote location that is different from a location of the automated retail vending store.

2. The automated store of claim 1 wherein the robotic apparatus is movable outside of the enclosure to deliver selected items to the consumer.

3. The automated store of claim 1, wherein the selected item is consigned through a consignment door in the enclosure.

4. The automated store of claim 1, wherein the shelf comprises a mechanism for shifting the selected item across the shelf to the robotic apparatus.

5. The automated store of claim 1, wherein the shelf receives an additional item from the robotic apparatus onto the shelf.

6. The automated store of claim 1, wherein the shelf comprises markings that indicate locations of the items on the shelf.

7. The automated store of claim 6, wherein the robotic apparatus utilizes the visioning system for navigating the enclosure.

8. The automated store of claim 6, wherein the robotic apparatus utilizes the visioning system for capturing an image of the selected item.

9. The automated store of claim 6, wherein the robotic apparatus utilizes the visioning system for verifying the retrieved item corresponds to the selected item.

10. The automated store of claim 6, wherein the robotic apparatus utilizes the visioning system for creating a map of the enclosure.

11. The automated store of claim 10, wherein the robotic apparatus utilizes the map for locating the selected item on the shelf.

12. The automated store of claim 1, comprising an ordering system for ordering the selected item from the remote location.

13. The automated store of claim 1, wherein the robotic apparatus comprises a visioning system.

* * * * *